United States Patent [19]
Bucalo

[11] 3,877,461
[45] Apr. 15, 1975

[54] DEVICE FOR CONTROLLING BODY FLUIDS

[75] Inventor: Louis Bucalo, Holbrook, N.Y.

[73] Assignee: Investors in Ventures, Inc., New York, N.Y.

[22] Filed: July 2, 1973

[21] Appl. No.: 375,360

Related U.S. Application Data

[63] Continuation-in-part of Ser. No. 155,141, June 21, 1971, Pat. No. 3,742,933.

[52] U.S. Cl.............................. 128/1 R; 128/260
[51] Int. Cl............................................. A61b 19/00
[58] Field of Search.......... 128/1 R, 260, 303 R; 3/1

[56] References Cited
UNITED STATES PATENTS

| | | | |
|---|---|---|---|
| 3,563,235 | 2/1971 | Zipper | 128/130 |
| 3,598,127 | 8/1971 | Wepsic | 128/260 X |
| 3,613,661 | 10/1971 | Shah | 128/1 R |
| 3,687,129 | 8/1972 | Nuwayser | 128/1 R |
| 3,699,956 | 10/1972 | Kitrilakis | 128/260 X |
| 3,742,933 | 7/1973 | Bucalo | 128/1 R |
| 3,777,737 | 12/1973 | Bucalo | 128/1 R |
| 3,443,561 | 5/1969 | Reed | 128/260 |

*Primary Examiner*—Dalton L. Truluck
*Attorney, Agent, or Firm*—Steinberg & Blake

[57] ABSTRACT

A device for controlling body fluids. An implant is situated in a body cavity and is provided at its exterior surface with a material which will have a predetermined influence on at least one component of a body fluid encountered by the implant at the body cavity.

3 Claims, 8 Drawing Figures

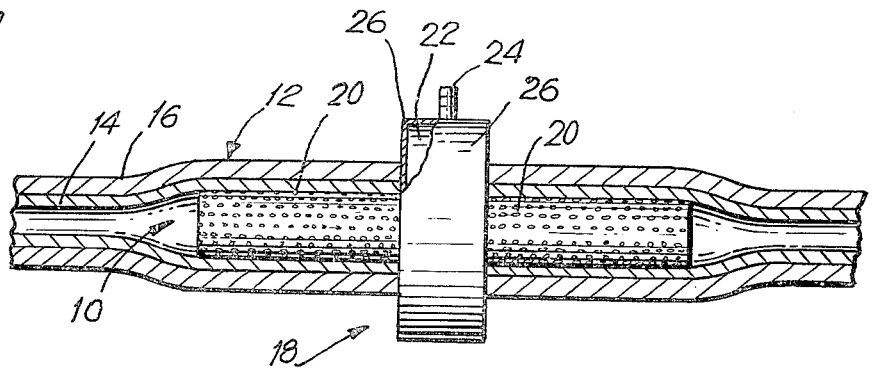
FIG.1
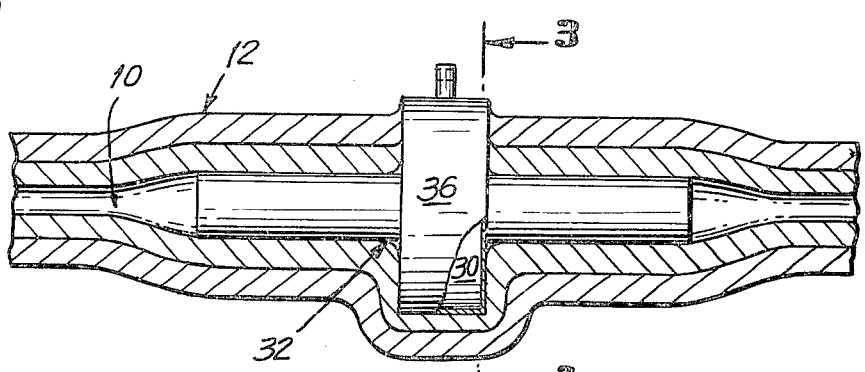
FIG.2
FIG.3
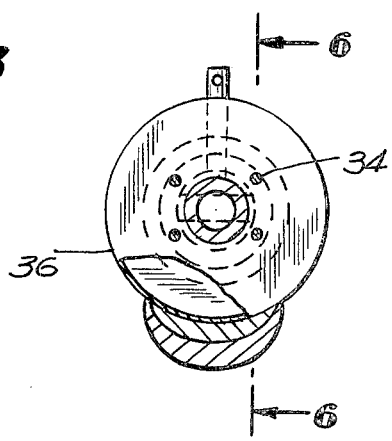
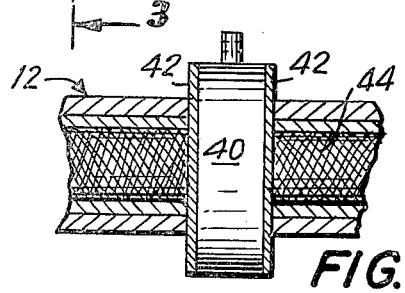
FIG.4
FIG.5
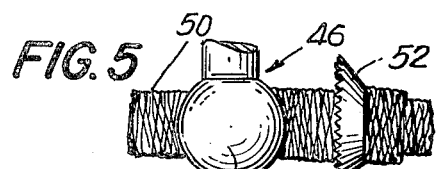
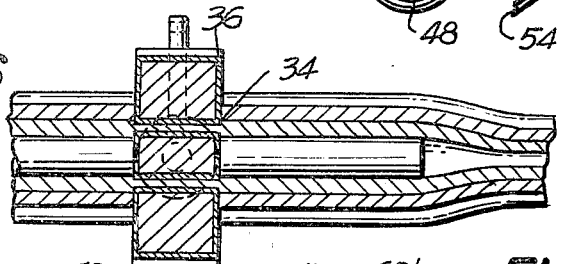
FIG.6
FIG.7
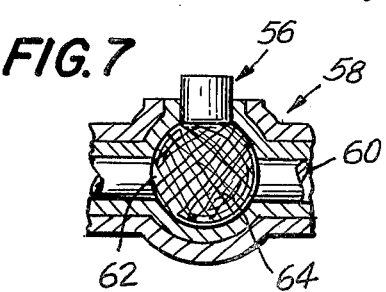
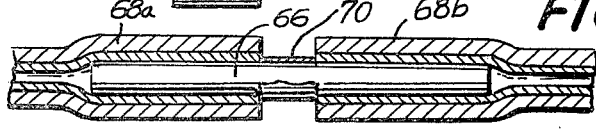
FIG.8

DEVICE FOR CONTROLLING BODY FLUIDS

CROSS REFERENCE TO RELATED APPLICATION

This application is a continuation-in-part of copending application Ser. No. 155,141, filed June 21, 1971 and entitled DEVICES FOR CONTROLLING FLUID FLOW IN LIVING CREATURES, now U.S. Pat. No. 3,742,933.

BACKGROUND OF THE INVENTION

The present invention relates to devices for controlling body fluids.

When introducing implants into the body of a living being, certain problems are encountered in certain situations. Thus, certain body fluids which are encountered by the implant have at least one component capable of moving along the exterior of the implant when the latter encounters the body fluid in the body cavity. This possibility of travel of a component of a body fluid along the exterior of an implant is in many situations highly undesirable and in some cases will defeat the purpose of the implant.

Thus, while it is possible at the present time to design implants to be received in body cavities in order to produce predetermined effects, sometimes the desired effects are not achieved in precisely the desired manner because of the fact that the body fluid or components thereof can bypass the implant at the exterior of the latter.

SUMMARY OF THE INVENTION

It is accordingly a primary object of the present invention to provide a device for avoiding the above drawbacks.

In particular, it is an object of the present invention to provide a device which makes it possible to avoid occurrence of undesired effects by the possibility of the component of a body fluid becoming situated along the exterior of an implant.

It is in particular an object of the present invention to provide a device of the above general type capable of effectively preventing travel of components of a body fluid along the exterior of an implant, in those cases where the body fluid has components capable of travelling undesirably along the exterior of the implant.

A more specific object of the present invention is to provide a construction according to which an implant which is situated in a vas deferens of a human male is capable of reliably preventing travel of sperm along the exterior of the implant.

The device of the invention includes an implant which is adapted to be situated in a body cavity of a living being, this implant carrying at its exterior a material for bringing about a predetermined influence on at least part of a component of a body fluid encountered by the implant at the body cavity.

BRIEF DESCRIPTION OF DRAWINGS

The invention is illustrated by way of example in the accompanying drawings which form part of this application and in which:

FIG. 1 is a schematic longitudinal elevation of the device of the invention shown in connection with a vas deferens which is shown in longitudinal section;

FIG. 2 illustrates a variation of the device of FIG. 1;

FIG. 3 is a transverse sectional elevation taken along line 3—3 of FIG. 2 in the direction of the arrow;

FIG. 4 is a fragmentary partly sectional elevation illustrating a further embodiment of a device of the invention;

FIG. 5 is a fragmentary illustration of yet another embodiment of a device according to the invention;

FIG. 6 is a sectional elevation taken along line 6—6 of FIG. 3 in the direction of the arrow;

FIG. 7 is a fragmentary elevation schematically illustrating partly in section a still further embodiment of a device of the invention; and FIG. 8 is a schematic illustration of a still further embodiment of a device according to the invention.

DESCRIPTION OF PREFERRED EMBODIMENTS

Referring to FIG. 1, the body cavity 10 illustrated therein is formed by the interior of a vas deferens 12 which has an inner layer of tissue 14 surrounded by an outer layer of tissue 16.

Situated within the body cavity 10 is at least part of an implant 18 in the form of a vas valve in the illustrated example. This implant 18 has elongated tubular portions respectively forming an inlet and outlet and respectively covered with a porous matrix 20 which forms a tissue ingrowth means for securing fixing the implant 18 in the body cavity 10. Between the tubular portions of the valve 18 which are respectively covered with the tissue ingrowth means 20, the implant 18 has a barrier 22 which is situated between the ends of the vas deferens 12 resulting from cutting across the vas deferens prior to situating the implant 18 therein in the manner illustrated in FIG. 1. The valve includes a rotary stem 24 which in a known way will operate a valve member situated in the interior of a valve housing for opening or closing the valve.

In accordance with the particular feature of the invention the barrier 22 is covered with a coating 26 which in the illustrated example may be a copper coating. As is well known this method forms a spermicidal agent.

With the method and device of FIG. 1 as described above if it should happen that any sperm travel along the exterior of the valve, such sperm will necessarily encounter the copper material 26 which acts in a well known manner as a spermicidal agent so as to prevent any living sperm from bypassing the implant.

The device shown in FIG. 2 is similar to that of FIG. 1. The difference is that the vas 12 instead of being cut completely through is only cut up to the lumen which forms the body cavity 10 so that along one side of the barrier 30 of the implant 32 the vas deferens remains continuous, as shown at the lower portion of FIG. 2. In this case also, as is apparent from FIG. 3, the barrier 30 is formed with longitudinal bores 34 through which the tissue of the vas can grow. As is shown in FIG. 6, the coating 36 which may also be copper extends not only along the exterior surface of the barrier 30 but also along the interior of the bores 34 to enhance the reliablity of the spermicidal agent which is carried by the implant.

The embodiment of the invention which is illustrated in FIG. 4 is similar to that of FIG. 1 insofar as the valve structure is concerned. However in the case of FIG. 4 the barrier 40 of the valve is situated between a pair of copper washers 42 slipped on to the valve over the tubular portions thereof prior to deposition of the porous matrix 44 which forms the tissue ingrowth means. FIG. 4 also shows part of the vas 12 extending up to the pair of washers 42. Inasmuch as these washers 42 are made of copper they will function as a spermicidal agent to reliably prevent any sperm from bypassing the implant along the exterior thereof.

FIG. 5 fragmentarily illustrates a vas valve 46 which may be situated in a vas deferens. The vas valve 46 has a central spherical housing portion 48 in which the rotary valve members housed so that when the rotary valve members turn it can be placed either in an open position or a closed position. The elongated inlet and outlet of the valve 46 are in this case also covered with a tissue ingrowth means 50 which may take the form either of gold wire or a porous matrix deposited in any suitable way as described above in connection with the porous matrix 20. According to the embodiment of the invention which is shown in FIG. 5, the tissue ingrowth means carries a holding means 52. While only one holding means 52 is shown in FIG. 5 on the right to be the portion, it is to be understood that a corresponding holding means is carried by the left to be the portion of the valve 46. The holding means 52 takes the form of a tapered strip of metal having a jagged free edge 54 capable of inserting itself into the wall of the vas so as to retain the tubular parts of the vas in proper position to assure proper growth of the tissue into the ingrowth means 50. However, in the case of FIG. 5, in accordance with the present invention, the holding means 52 is made also of a material which has a spermicidal effect, such as copper, so that in addition to its other functions, the holding means 52 will serve also as a spermicidal agent to prevent any sperm from travelling along the exterior of the implant.

According to the device illustrated in FIG. 7 the implant 56 is also in the form of a valve situated in a vas deferens 58. In this case the tubular portions 60 are fragmentarily illustrated without any tissue ingrowth means thereon although of course such an ingrowth means may be used. However, in accordance with the present invention the central spherical housing part 62 of the valve has a wire 64 wound around its exterior a number of times so that this wire will indeed act as a tissue ingrowth means, and in addition the wire 64 is made of a material which acts as spermicidal agent. Thus, the wire 64 may be a fine copper wire which is wound a number of times around the valve in a manner shown in FIG. 7, so that in this way the wire itself will act as a spermicidal agent in addition to performing the other functions. it is to be noted that in the case of FIG. 7 the vas deferens 58 is illustrated only as being cut through up to the lumen, so that except for the incision in the upper part of the vas as illustrated in FIG. 7, the vas is not cut through and it has a continuous wall illustrated at the lower part of FIG. 7. In this respect the method of treating the vas in FIG. 7 is similar to that of FIG. 2. Thus, if any sperm should happen to travel along the exterior of the implant, such a component of the body fluid will necessarily encounter the spermicidal agent formed by the wire 64 and thus be prevented from travelling along the wire.

In the embodiment of the invention which is illustrated in FIG. 8, there is a simple tube 66 which forms the implant. This tube 66 is in this case also shown as extending at its opposed elongated end regions into a pair of parts 68a and 68b of a vas deferens. Thus, the body fluid is capable of flowing freely through the tube 66 between the parts 68a and 68b of the vas deferens. Such an implant would have various uses. For example in the case where a vasectomy has been performed and it is desired to reestablish the flow of body fluid through the vas deferens a surgeon may take procedures which will result in an arrangement as shown in FIG. 8 according to which the previously blocked vas deferens has its portions interconnected by the tube 66.

With such a device, in accordance with the present invention, there is situated at the exterior surface of the tube 66 a spermicidal agent 70 which in the example of FIG. 8 also may be a copper coating. In this way if it should happen that any sperm should find their way along the exterior of the tube 66 into the space between the portions 68a and 68b, such sperm would encounter the spermicidal agent 70, so that in this way the travel of a desired component of a body fluid is restricted to the interior of an implant such as the tube 66.

It is to be understood that the device of the invention is described above in a specific manner only for the sake of simplicity in illustrating examples of the invention. Thus, the implant may take forms other than those illustrated in the drawings and described above and the spermicidal agent may take a wide variety of forms. The spermicidal agent may be placed on the implant at any time prior to completion of the procedures involved in situating the implant in the body cavity. Thus the spermicidal agent may be situated on the implant prior to introduction thereof into the body or the spermicidal agent may situated on the implant after it has been introduced into the body but before all of the procedures involved in connection with situation of the implant in the body have been completed.

Furthermore, the use of copper as a spermicidal agent is only presented above by way of example. There are other known spermicidal agents which may be used. Thus, in the case of metals it is known that metals such as zinc, copper, tin, silver and magnesium have spermicidal properties, and any of the latter metals may be used with or without copper in various alloys. For example it is known that copper alloyed with zinc and nickel has highly effective spermicidal properties.

Of course any of the various known materials commonly introduced into the vagina to prevent conception would be suitable for use as a spermicidal agent.

A list of spermicidal agents which may be used with the implant of the present invention follows, with the list indicating the nature and property of the various chemical contraceptives, while the name and composition as well as type of the various jellies follow, with this latter group of jellies being followed by a group of creams, and the final example being a foam which could be used as a spermicidal agent:

Nature and Properties of Chemical Contraceptives

| Type | Example | Action |
| --- | --- | --- |
| Heavy Metals | $Hg^{++}$ | SH inhibitor |
| Surfactants | Nonionic and anionic detergents; Cationic detergents; Vitamin A-OH | Membrane solubilizers |
| Antibiotics | Bacitracin<br>Spiromycin<br>Filipin<br>Antimycin | Energy metabolism blockers<br>Membrane disrupters |
| Cations | $Ca^{++}$<br>$K^+$<br>Zn | Interference with motile mechanisms of sperm |
| Enzyme inhibitors (anti-acrosome enzymes) | Inhibition of hyaluronidase and/or neuraminidase (DF) | — |
| Antibodies | Antibodies to purified sperm specific antigens or to acrosomal proteins | Agglutinators |
| Seminal plasma | Seminal spermine plus diamine — oxidase gives rise to unknown oxidation products (probably aldehydes) | |

Jellies

| | Name | Ingredients | Type |
| --- | --- | --- | --- |
| 1. | Ortho-Gynol Jelly | riconoleic acid, p-diisobutyl phenoxypolyethanol, boric acid | detergent |
| 2. | Laneen-jelly (Esta prods.) | ricinoleic acid, hexylresorcinol, chlorothymol, glycerin, sodium benzoate | surface active |
| 3. | Trimo san Therapeutic jelly (used as antifungus agent) | phenylmercuric acetate, sodium lauryl sulfate | heavy metal detergent |
| 4. | Lurophyn suppositories and jelly | phenylmercuric acetate, polyethylene glycol | heavy metal nonionic surfactant |
| 5. | Preceptin gel (Ortho) | ricinoleic acid, p-diisobutyl phenoxypolyethoxy ethanol | surface active nonionic surfactant |
| 6. | Contral Paste (Jelly, Egypt) | phenylmercuric nitrate | heavy metal inhibitor |
| 7. | O.A.K. Jelly (Denmark) | hexyl rsorcinol, propylene glycol, sodium alginate | —<br>—<br>— |
| 8. | Dupree Jelly | phenylmercury borate, oxyquinoline sulfate, lactate, borate | heavy metal redox inhibitor acid |
| 9. | Genoson Jelly | ricinoleate, oxyquinoline sulfate, merthiolate | (surfactant) redox poison |
| 10. | Kemi Jelly | lactate, borate oxyquinoline sulfate | acid redox block |
| 11. | M. Lex Crescent Jelly | sodium lauryl sulfonate | anionic surfactant |
| 12. | Milex Crescent Jelly | ricinoleic acid, glycerol, oxyquinoline sulfate | surface active redox inhibitor |
| 13. | Natogel Jelly | oxyquinoline sulfate | redox inhibitor |
| 14. | Safetycin Jelly (Taiwan) | phenylmercuric acetate | heavy metal (SH inhibitor) |

Creams

| | Name | Ingredients | Type |
|---|---|---|---|
| 1. | Ortho-creme | ricinoleic acid, sodium lauryl sulfate, boric acid, nonoxynol-9 | anionic detergent nonionic detergent |
| 2. | Creemox creme | nonylphenoxy polyoxyethylene, beta napthol, phenol trioxymethylene | nonionic detergent acid |
| 3. | Kemi-creme | paraformaldehyde oleate | oxidizing agent protein inactivator surfactant |
| 4. | Tutus Creme (East Germany) | p-hydroxybenzoate aluminum subacetate "Letio-Lanette Wax" | heavy metal |

Foams

| Name | Ingredients | Type |
|---|---|---|
| Delphen Vaginal Foam | nonoxynol-9 (oil-H$_2$O emulsion) pH 4.5 | nonionic surfactant |

What is claimed is:

1. For use in a body cavity of a living being, a vas valve implant adapted to be situated in a vas deferens and a spermicidal agent material carried by the implant at the exterior thereof for effecting a predetermined spermicidal influence on sperm in a body fluid encountered by the implant at the body cavity when the sperm is situated at the exterior of the implant, the material being in the form of a holding means for holding the vas valve in the vas deferens.

2. For use in a body cavity of a living being, an implant adapted to be situated at the body cavity, and a material carried by said implant at the exterior thereof for effecting a predetermined influence on at least a component of a body fluid encountered by the implant at the body cavity, the implant having an elongated configuration and the material at the exterior thereof being situated between opposed ends of the implant, said implant being a vas valve and the material being a spermicidal agent, the vas valve having an intermediate barrier and said material being situated against opposed ends of the barrier.

3. The combination of claim 2 and wherein said material is in the form of a pair of washers respectively situated against said opposed ends of the barrier.

* * * * *